(12) United States Patent
Nemetz et al.

(10) Patent No.: US 8,586,886 B2
(45) Date of Patent: Nov. 19, 2013

(54) SWITCH MECHANISM FOR A POWER CUTTER

(75) Inventors: Uwe Nemetz, Huenfelden Nauheim (DE); Stefan Sell, Mainz (DE)

(73) Assignee: Black & Decker Inc., Newark, DE (US)

( * ) Notice: Subject to any disclaimer, the term of this patent is extended or adjusted under 35 U.S.C. 154(b) by 775 days.

(21) Appl. No.: 12/820,677

(22) Filed: Jun. 22, 2010

(65) Prior Publication Data

US 2010/0323592 A1    Dec. 23, 2010

(30) Foreign Application Priority Data

Jun. 23, 2009  (GB) .................................. 0910774.9

(51) Int. Cl.
*H01H 9/28*    (2006.01)
(52) U.S. Cl.
USPC ......................................................... 200/43.01
(58) Field of Classification Search
USPC ................ 200/43.01, 4, 5 R, 18, 11 C, 50.32, 200/50.36, 50.33, 5 B–5 D, 50.01, 50.37, 200/332.2, 61.85
See application file for complete search history.

(56) References Cited

U.S. PATENT DOCUMENTS

| 2,948,792 | A |  | 8/1960 | Elliott et al. |
| 3,170,995 | A |  | 2/1965 | Mullen |
| 5,369,230 | A | * | 11/1994 | Misawa ....................... 200/52 R |
| 6,958,455 | B1 | * | 10/2005 | Lui .............................. 200/43.17 |
| 7,264,230 | B2 |  | 9/2007 | Burns et al. |
| 7,439,458 | B2 | * | 10/2008 | Montalvo ........................... 200/4 |
| 7,920,075 | B2 | * | 4/2011 | Wu .................................. 341/35 |
| 8,168,907 | B2 | * | 5/2012 | Nemetz ......................... 200/400 |

FOREIGN PATENT DOCUMENTS

| EP | 1236894 B1 | 6/2006 |
| GB | 2232913 A | 2/1991 |
| WO | 2005/056225 A1 | 6/2005 |

OTHER PUBLICATIONS

Simonini, Stefano—European Search Report re EP 10165145—Oct. 7, 2010—Munich.

* cited by examiner

*Primary Examiner* — Edwin A. Leon
(74) *Attorney, Agent, or Firm* — Rhonda L. Barton

(57) ABSTRACT

A switch mechanism includes a support structure and an electric switch having an activator moveable between a first position where the electric switch is ON and a second position where the electric switch is OFF. A cam is connected to a first actuator, moveably mounted on the support structure, so that movement of the first actuator results in movement of the cam. A bar is connected to a second actuator, moveably mounted on the support structure, so that movement of the second actuator results in movement of the bar. The cam engages the activator so that movement of the cam by movement of the first actuator results in the activator moving between its two positions. The bar engages the activator so that movement of the bar by movement of the second actuator results in the activator moving between its two positions.

14 Claims, 16 Drawing Sheets

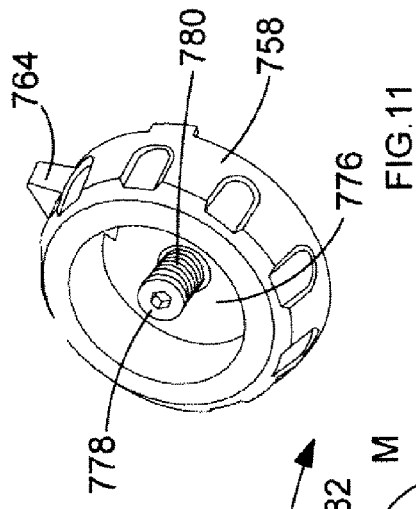
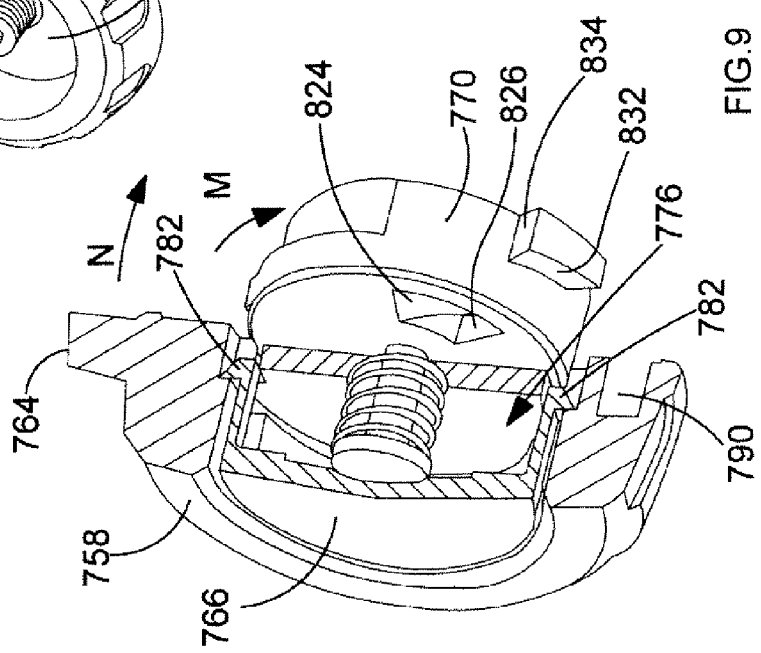
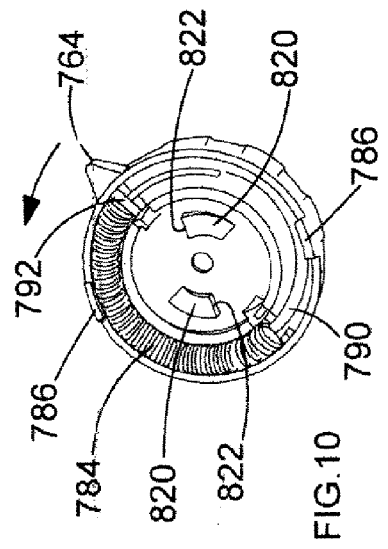
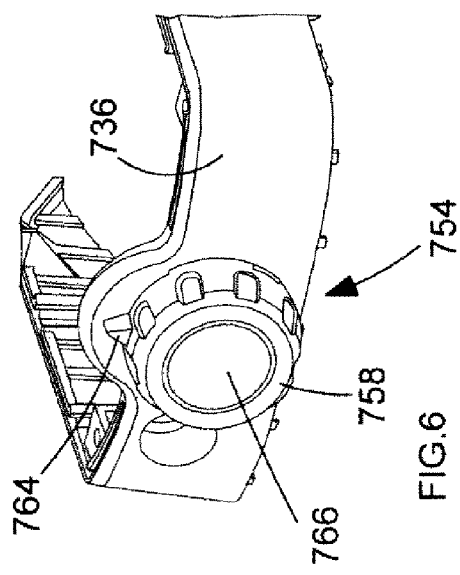

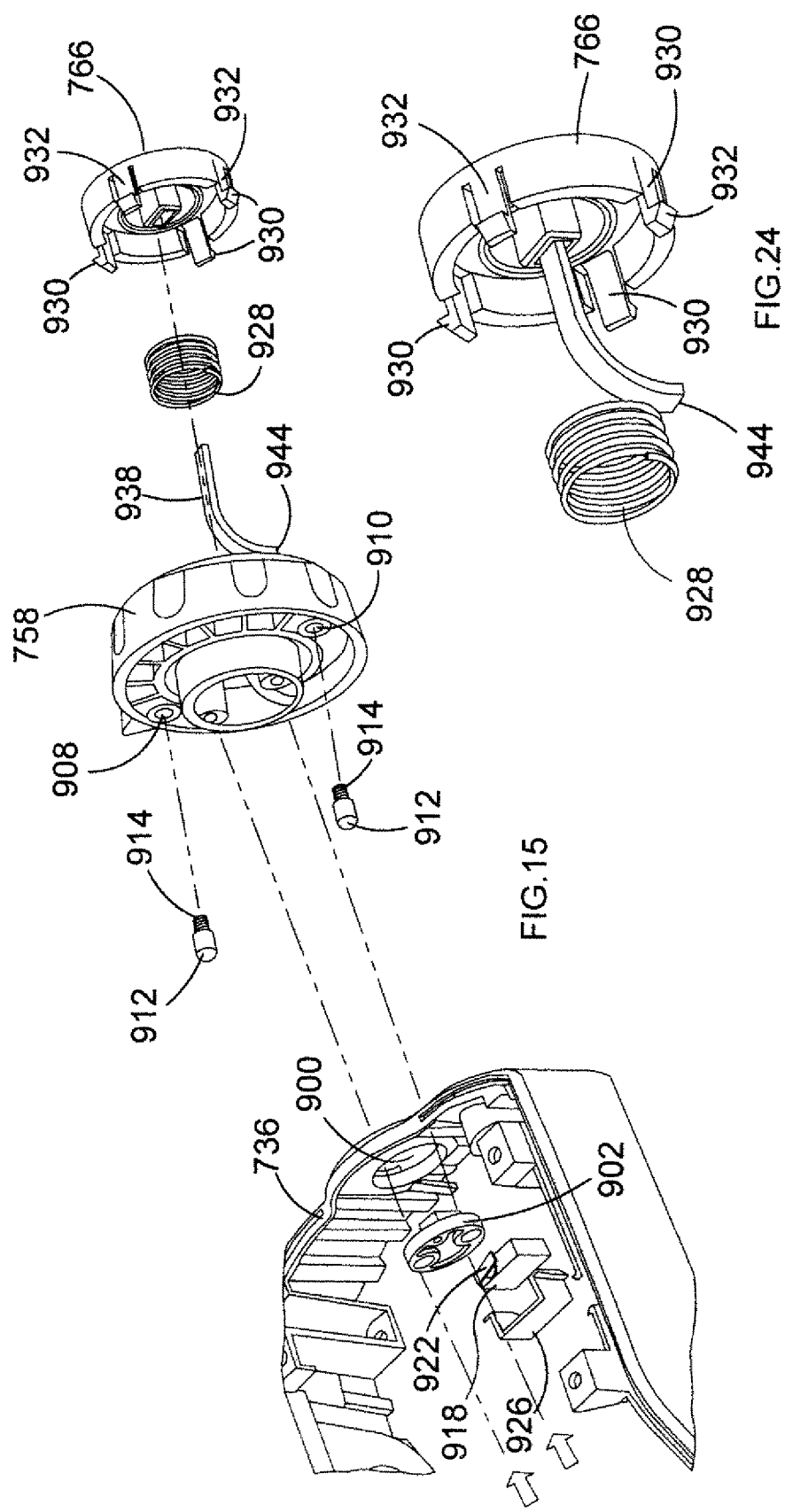

SWITCH MECHANISM FOR A POWER CUTTER

CROSS-REFERENCE TO RELATED APPLICATIONS

The present application claims priority to GB 0910774.9 filed Jun. 23, 2009. GB 0910774.9 is incorporated by reference in its entirety.

TECHNICAL FIELD

The present invention relates to a switch mechanism, in particularly to a switch mechanism for a power tool such as a power cutter.

BACKGROUND OF THE INVENTION

A typical power cutter comprises a housing in which is mounted a two stroke internal combustion engine. Attached to the side of the housing is a support arm which extends forward of the housing. Rotatably mounted on the end of the support arm is a cutting blade, usually in the form of a grinding disk. The motor is drivingly connected to the cutting blade via a drive belt. The rotary output of the engine rotatingly drives the cutting blade via the drive belt. The drive belt is driven via a centrifugal clutch which enables the output drive spindle of the engine to disengage from the belt when the engine is running at a slow speed, to allow the engine to continue running, whilst allowing the blade to be stationary.

Also mounted in the housing is a fuel tank which provides fuel for the engine via a carburetor. An oil tank can also be provided, which provides lubricating oil to mix with the fuel, to lubricate the engine.

Mounted on the rear of the housing is a rear handle for supporting the power cutter, which contains a trigger switch for accelerating the engine upon depressing. Depression of the trigger switch causes more of the aerated fuel/oil mixture to be injected into the engine which in turn causes the speed of the engine to accelerate.

GB2232913 and WO2005/056225 show such power cutters.

Power cutters are typically started using a pull cord. Once started, the engine will continue to run in an idle mode until stopped. It is important to provide a switching mechanism which prevents the power cutter from being started when it is in the OFF position, and which allows it to be started when it is in the ON position. The switching mechanism is also used to stop the engine when it is running by being switched from its ON position to its OFF position. However, it is desirable to be able to switch the engine off quickly during an emergency situation.

Unpublished UK patent application No. 0812274.9 discloses a power cutter having such an ON/OFF switching mechanism and which is described in detail below. However, the problem associated with such a design of the ON/OFF switching mechanism is that it is complex and difficult to assemble. Furthermore, such a design is prone to failure due to dust and debris, created during the operation of the power cutter, penetrating the switch mechanism and interfering with the operation of the various component parts, such as the relative movement of the ramps.

The present invention provides a simplified design of an ON/OFF switching mechanism to that disclosed in UK patent application no. 0812274.9 and which is less prone to failure due to dust and debris.

BRIEF SUMMARY OF THE INVENTION

According to a first aspect of the present invention, there is provided a switch mechanism comprising a support structure. An electric switch is mounted on the support structure and comprises an activator moveable between a first position where the electric switch is switched on and a second position where the electric switch is switched off. A first actuator is moveably mounted on the support structure. A cam, having a cam surface, is connected to the first actuator so that movement of the first actuator results in movement of the cam. A second actuator is moveably mounted on the support structure; and a bar is connected to the second actuator so that movement of the second actuator results in movement of the bar. The cam engages the activator so that movement of the cam by movement of the first actuator results in the activator moving between its two positions. The bar engages the activator so that movement of the bar by movement of the second actuator results in the activator moving between its two positions. The bar passes through or alongside the surface of the cam when it engages the activator.

According to a second aspect of the present invention there is provided a power tool comprising a switch mechanism wherein 1) when the electric switch is on and the power tool is deactivated, the power tool is able to be activated; 2) when the electric switch is off and the power tool is deactivated, the power tool is prevented from being activated; and 3) when the electric switch is switched from being on to being off when the power tool is activated, the power tool is deactivated.

The power tool can be a power cutter.

BRIEF DESCRIPTION OF THE DRAWINGS

An embodiment of the present invention will now be described with reference to the accompanying drawings of which:

FIG. 6 shows an example of a rotatable on/off switch;

FIG. 9 shows a cut away view of the switch;

FIG. 10 shows the underside of the knob;

FIG. 11 shows the knob, bolt, and spring;

FIG. 15 shows an exploded view of an embodiment of the on/off switch according to the present invention;

FIG. 24 shows an alternative design of the stop button.

DETAILED DESCRIPTION OF THE INVENTION

Figure 1:
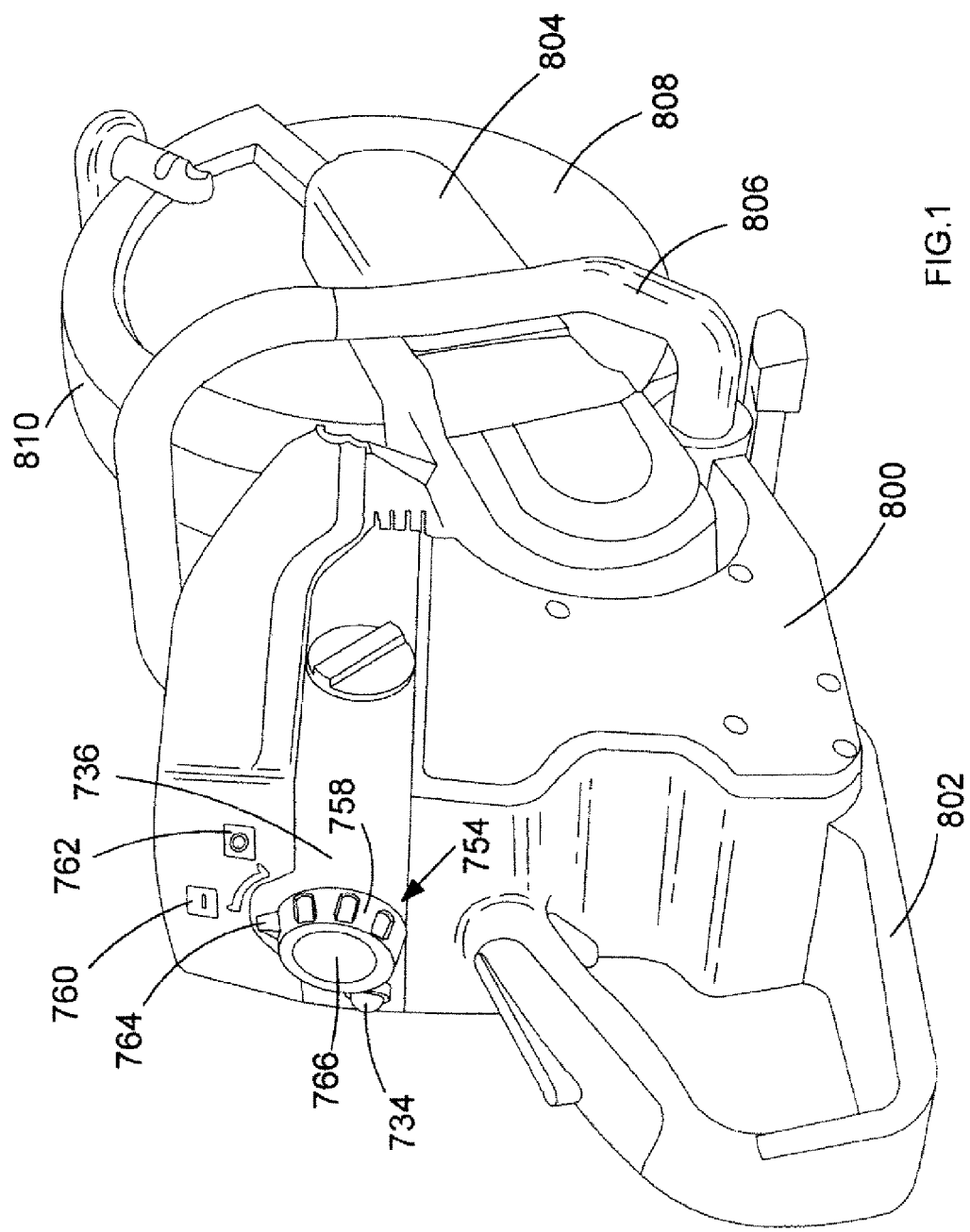
FIG. 1 shows a rear perspective view of the power cutter.

With reference to FIGS. 1 to 14, FIG. 1 shows a power cutter which comprises a housing 800 in which is located a two stroke engine 116,118, a rear handle 802, a support aim 804 and a front handle 806. A cutting blade 808 is rotatably mounted on the support arm and which can be driven by the engine. A guard 810 surrounds the top part of the blade 808.

Figure 2:
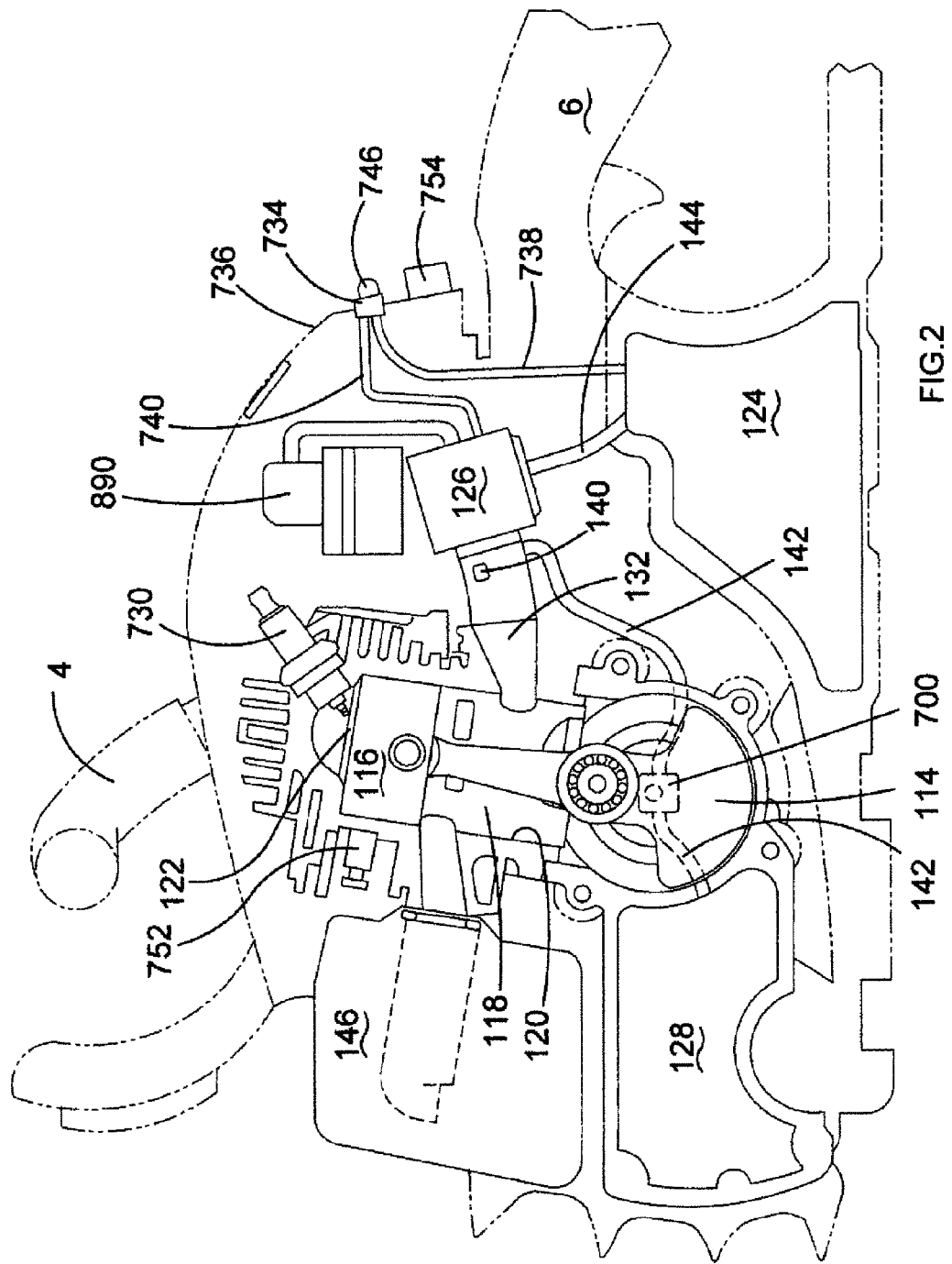
FIG. 2 shows a schematic view of the engine of the power cutter.

Referring to FIG. 2, the two stroke internal combustion engine 116,118 is fed with an air/fuel mixture from a carburetor 126. The engine 116,118 burns the mixture in a well known manner to generate rotary motion of its crank shaft 114, which connects to an output shaft. The exhaust gases are then expelled from the engine 116,118 through an exhaust 146 to the surrounding atmosphere. The engine 116,118 is started using a pull cord in well know manner.

The power cutter comprises a fuel tank 124 in which is located fuel for driving the two stroke internal combustion engine 116,118. Fuel will pass from the tank 124 via passageway 144 through the carburetor 126 which will mix the fuel with air from an air filter 890, prior to being forwarded to the cylinder 120 where it will be burnt. A second tank 128, as shown in which lubricating oil will be contained, will also be mounted in the body. The oil will be pumped out of the tank 128 via an oil pump 700. The oil pump 700 will pump the oil through the oil passageways indicated by lines 142 from the oil tank 128 via the pump 700 into the passageway 132 between the carburetor 126 and the cylinder 120, in a suitable form, for example, as a spray or atomized, which is then mixed with the air/fuel mixture generated by the carburetor 126. A sensor 140 is mounted within the passageway 132 between the carburetor 126 and cylinder 120. The sensor monitors the amount of oil being added to the fuel/air mixture and sends a signal, via an electric cable 701, indicative of the amount of oil in the passageway 132 back to an electronic controller 716 (see FIG. 3). Such a sensor can be of a capacitance type whereby the sensor monitors the change in capacitance between two plates, the capacitance being a function of the amount of oil there is in the fuel/air mixture.

The carburetor 126 is a standard design which, during normal operation, operates with out any external power input. However, the carburetor 126 comprises a solenoid 714. There are a number of ways a carburetor can use a solenoid. Two ways are:

(1) The solenoid can open a channel within the carburetor which allows the fuel to get direct access to the passageway leading to the cylinder. This provides the engine with an air/fuel mixture which is richer in fuel; and (2) The solenoid can close an air channel within the carburetor, which passes clean air around the carburetor to the passageway. With the airflow closed by the solenoid (or substantially closed), the air/fuel mixture is richer in fuel.

The solenoid is used when the engine is cold to provide an air/fuel mixture which is richer in fuel to help start the engine.

When the engine is warm, the solenoid is either non-utilized or is switched off. The temperature of the engine is measured using a sensor 710 located on the engine block. The solenoid 714 is used to replace the choke on the carburetor whereby an operator could manually adjust the valve to start the engine when it is cold.

Figure 3:
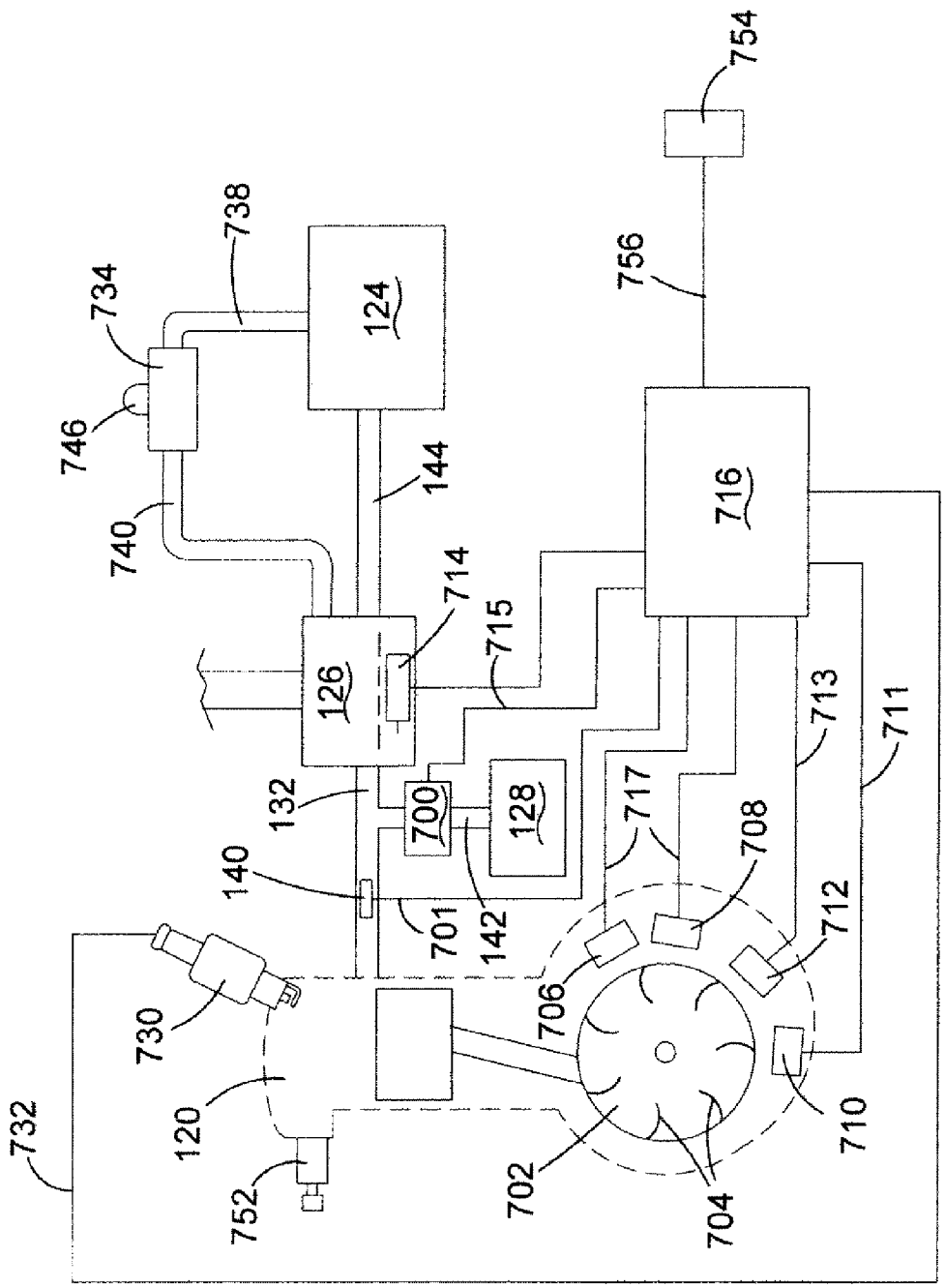
FIG. 3 shows a control system for the engine.

The engine ignition system is controlled by the electronic controller 716, the function of which is described in more detail below with reference to FIG. 3.

Mounted on the end of the end of the crank shaft 114 is a flywheel 702 which contains a number of metal fins 704 which form an impeller. As the flywheel 702 rotates, the impeller blows air around the out side of the engine. Adjacent the impeller 702 are two generators 706, 708. The two generators generate electricity using magnets and the change of inductance caused by the rotating flywheel 702. As the flywheel 702 rotates, it causes the two generators 706, 708 to produce electricity. The first generator 706 is used to provide electricity for the ignition system of the engine and the electronic controller 716. The second generator 708 is used to provide electricity for the oil pump 700 and the solenoid 714 in the carburetor. Both are connected to the electronic controller 716 via cables 717.

Also mounted adjacent the flywheel are two sensors 710, 712. The first sensor 710 monitors the temperature of the engine block and sends a signal via an electric cable 711 indicative of the temperature to the electronic controller 716. The second sensor 712 monitors the angular position of the flywheel 702 and sends a signal via an electric cable 713 indicative of the angular position of the flywheel 702 back to the electronic controller 716. This signal can also be used by the electronic controller 716 to determine the rate of rotation of the flywheel 702, as well as its angular position.

Figure 4:
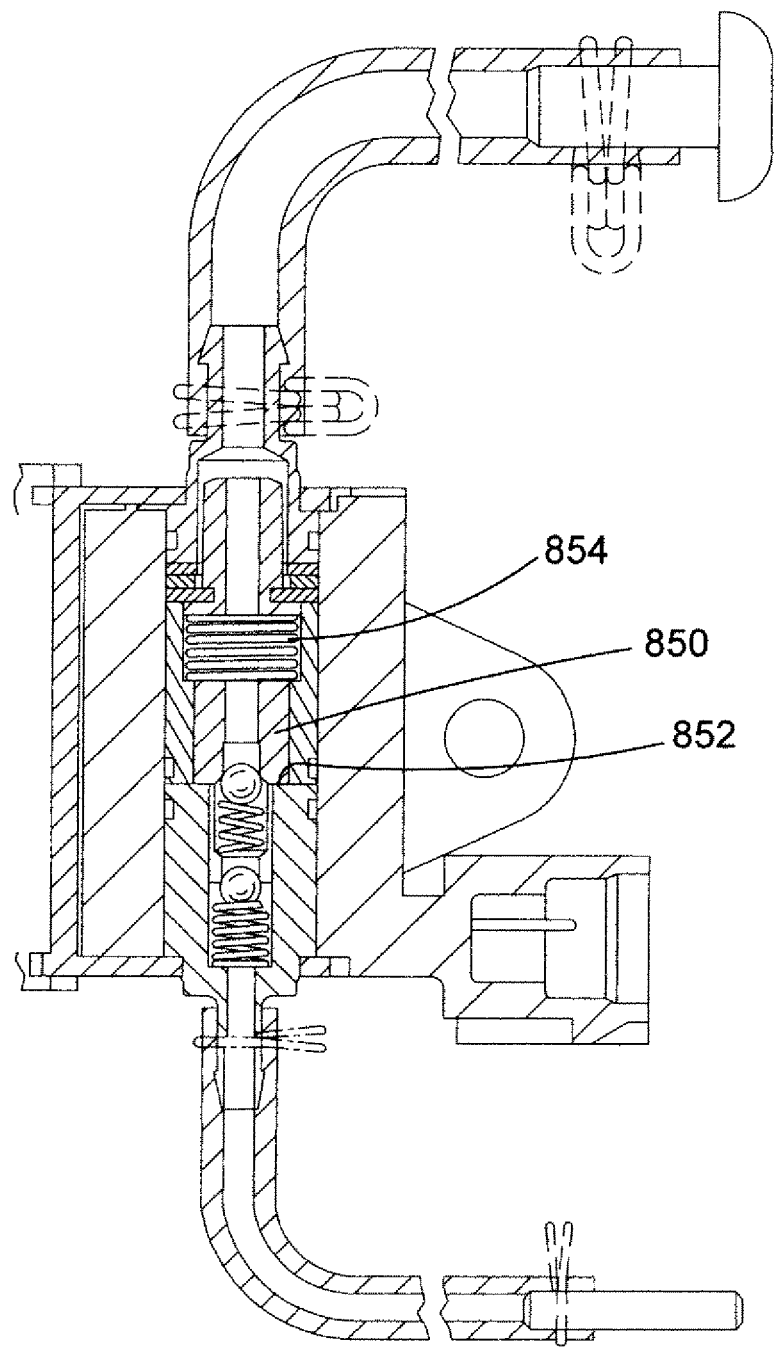
FIG. 4 shows an oil pump.
Figure 5:
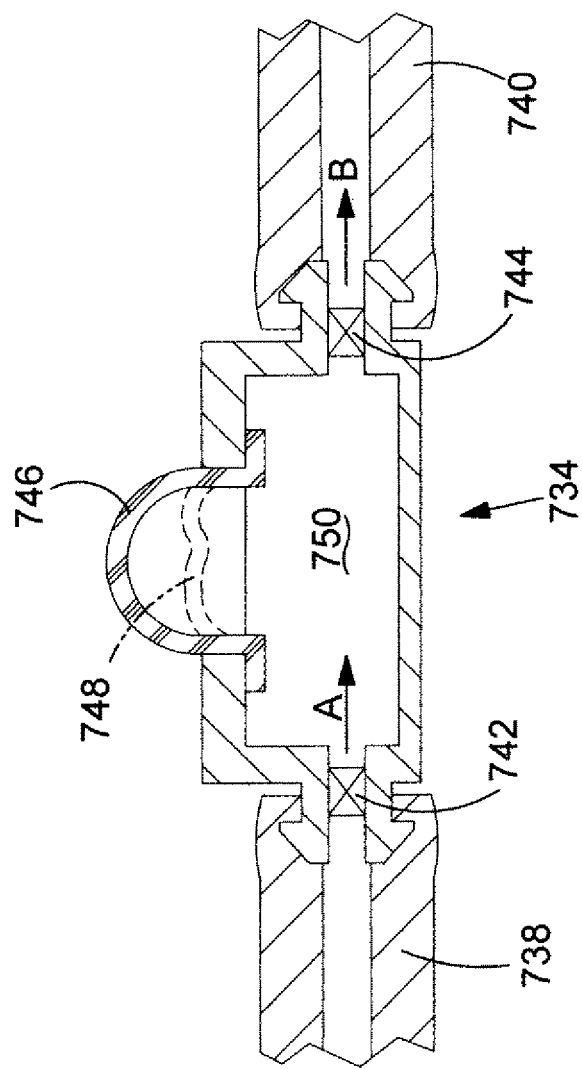
FIG. 5 shows a primer.

The oil pump 700 is an electrically powered oil pump 700, the power for which is supplied by the electronic controller 716 via electric cable 715. The oil pump is shown in FIG. 4. This type of oil pump is described in EP1236894. The oil pump 700 is driven by the electronic controller 716 which sends a square shaped voltage signal 892 to the oil pump (see FIG. 14A) When the voltage is at V1, it causes the piston 850 of the pump to move, reducing the size of the oil chamber 852. This causes a preset amount of oil to be pumped out of the chamber 852. When voltage is "0", the piston returns to its starting position due to the biasing of the spring 854, enlarging the oil chamber 852 and allowing the chamber 852 to fill with oil. The higher the frequency of the square shaped voltage signal 892, the more oil the oil pump 700 pumps per unit of time. The oil pump is capable of running at two speeds (the first speed shown in FIG. 14A, the second speed being shown in FIG. 14B where the frequency of the square shaped voltage signal 892, and hence the movement of the piston 850, is double) and its general operation is described in more detail below.

A spark plug 730 is connected to the electronic controller 716 via a cable 732. Ignition of the spark plug is controlled by the electronic controller 716.

A primer 734 is mounted on the rear wall 736 of the housing 800 of the power cutter. See FIG. 1. The primer is a manual pump. A first pipe 738 connects from the fuel tank 124 to the primer 734. A second pipe 740 connects from the primer to the carburetor 126. A brief description of the principle of how the primer works will now be described with reference to FIG. 5. The primer has two valves 742, 744 located in series which allow the fuel to flow one way through them only (indicated by Arrows A and B). Located between the two valves 742, 744 is a chamber 750 having a rubber dome 746 forming a wall which is accessible to the user of the power cutter. One valve 742 only allows fuel to enter the chamber 750, while the other only allows fuel to leave the chamber 750. In order to use the primer, the operator, presses the rubber dome 746 (shown as dashed lines 748). This reduces the amount of volume in the chamber 750 formed between the valves and hence the amount of space which can contain fuel. As such, fuel is ejected from the primer through the one of the valves 744, as the second valve 742 remains closed, preventing fuel from leaving the chamber 750 via that valve 742. When the operator releases the dome 746, the volume of the chamber 750 increases, causing fuel to be sucked into the chamber 750 through the second valve 742 as the first valve remains closed 744 preventing fuel from entering the chamber 750 through that valve 744. Repetitive pressing and releasing of the dome 746 results in the fuel being pumped through the primer 734. The primer is arranged so that the operator can manually pump the fuel from the tank 124 to the carburetor 126 through the pipes 738, 740.

The purpose of the primer is to enable the operator to place fuel into the carburetor. Otherwise the operator has to spin the engine a number of times using the pull cord before a sufficient amount of fuel is sucked through into the carburetor 126.

A DECO valve 752 is mounted on the side of the cylinder 120. The valve 752 is opened manually by the operator prior to starting the engine. When opened, the DECO valve reduces the pressure within the cylinder 120 prior to ignition. This enables the starting of the engine using the pull cord to be easier as the amount of compression of the fuel/air mixture required is reduced. When the engine is started, the DECO valve automatically closes.

The electronic controller 716 has an on/off switch 754 in the form of a rotatable knob 758. The on/off switch 754 is connected to the electronic controller via an electric cable 756.

The knob 758 has a pointer 764 integrally formed on its periphery. The rotatable knob 758 has two angular positions between which it can rotate. In the first position, the switch is ON. In this position, the pointer 764 points to an ON label 762 (see FIG. 1). In the second position, the switch is OFF. In this position, the pointer 764 points to an OFF label 760. When the rotatable knob is in the ON position, the operator can start the engine and use the power cutter. When the rotatable knob 758 is in the OFF position, the engine is prevented from being started. If the rotatable knob 758 is moved from the ON to the OFF position when the engine is running, the engine is automatically switched off A stop button 766 is located in the center of the knob 758. If the engine is running (i.e., the knob is in the ON position), depression of the stop button 766 will result in the engine being switched off. The knob 758 then automatically returns to the OFF position. If the knob 758 is prevented from returning to the OFF position after the stop button has been depressed, the engine will not be able to be started until the knob 758 has been allowed to return to the OFF position.

The construction of the assembly for the ON/OFF switch 754, which includes the knob 758 and stop button 766, will now be described.

The ON/OFF switch assembly comprises the rotatable knob 758, a crank 768, a switch cam 770 and the stop button 766.

The crank 768 is rigidly fixed into the rear wall 736 of the housing 800 and prevented from rotation. The crank 768 comprises a socket 772 into which is rigidly mounted a micro switch 774 (see FIG. 8C).

Figure 7:
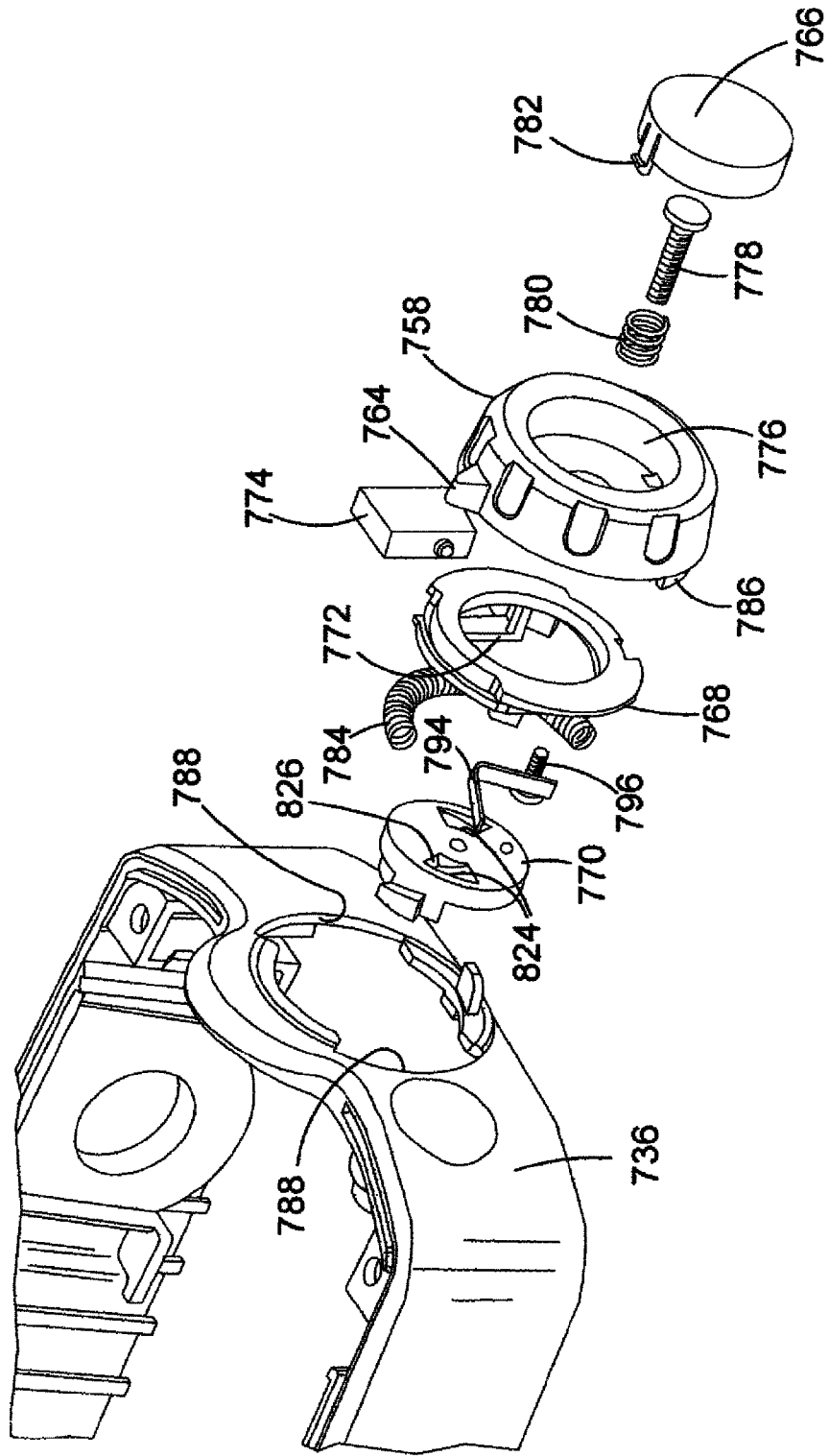
FIG. 7 shows an exploded view of the switch.

As shown in FIG. 7, rotatably mounted on the outside of the crank 768 is the knob 758. Rotatably mounted on the inside of the crank 768 is the switch cam 770. A bolt 778, which passes through the base of a tubular recess 776 formed in the knob 758, screws into the switch cam 770 and is rigidly attached thereto. Sandwiched between the head of the bolt 778 and the base of the recess 776 is a spring 780. The bolt 778 and spring 780 hold the knob 758 and switch cam 770 onto the crank 768, biasing them towards each other as the spring biases the head of the bolt 778 away from the base of the recess 776. The knob 758 can rotate through a limited range of positions (between the ON and OFF positions) relative to the crank 768. The range of positions is limited by pegs 786 formed on the underside of the knob engaging with recesses 788 formed in the edge of the rear wall 736 of the housing. The switch cam 770 can also rotate through a limited range of positions relative to the crank 768. In addition, the switch cam 770 can axially slide relative to the crank 768 in a direction parallel to the longitudinal axis of the bolt 778 over a limited range of positions, the range being limited by the length of the bolt 778 within the recess 776. The bolt 778 rotates and slides with the switch cam 770.

The stop button 766 is mounted within the tubular recess 776 formed in the knob 758 and encloses the end of the bolt 778 located in the recess 776 and the spring 780. (See FIG. 9). The stop button 766 can axially slide within the recess 776 towards or away from the switch cam 770. The range of outward axial movement of the stop button is limited by stops 782 each engaging with an inner step of the knob 758. The head of the bolt 778 directly abuts the underside of the stop button 766. Depression of the stop button, causes the bolt 778 to be pushed through the base, compressing the spring 780, moving the switch cam 770 away from the crank 768 and knob 758.

Connected between the knob 758 and the crank 768 is a long helical spring 784. The helical spring 784 is located in a circular channel 790 formed on the underside of the knob 758 as best seen in FIG. 10. One end of the helical spring 784 abuts against a wall 792 at the end of the channel 790. The other end abuts against a stop (not shown) formed on the crank 772. The spring 784 rotationally biases the knob 758 relative to the crank to its OFF position.

Figure 12:
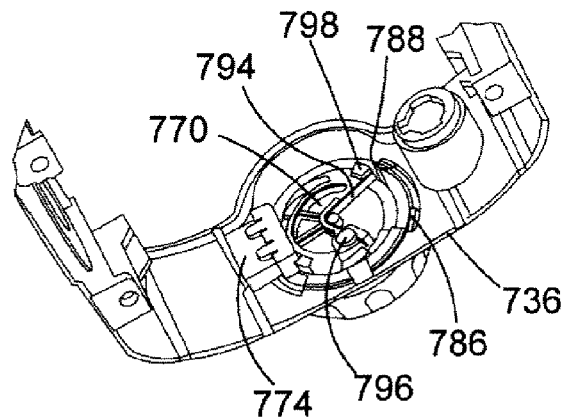
FIGS. 12 and 13 show rear views of the switch.
Figure 13:
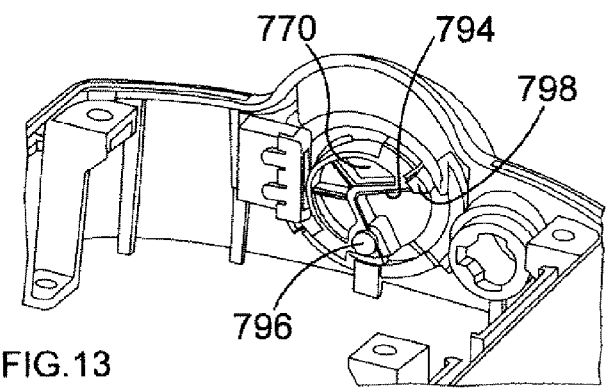
Figure 14A:
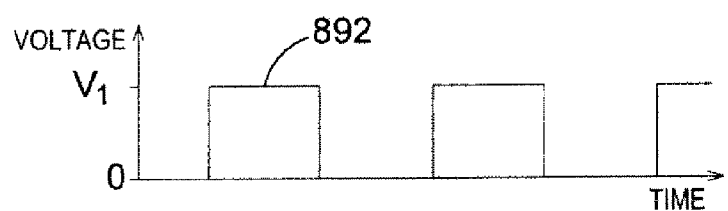
FIGS. 14A and 14B show the electric signal sent to the oil pump from the electronic controller operating at two speeds, a slow speed (FIG. 14A) and a high speed (FIG. 14B)
Figure 14B:
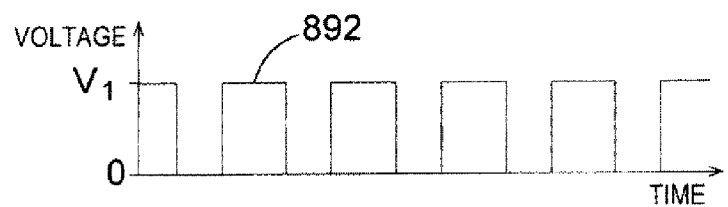

Connected between the switch cam 770 and the crank 768 is a leaf spring 794 as best seen in FIGS. 12 and 13. One end of the leaf spring 794 is connected using a small bolt 796 to the switch cam 770. The other end abuts a stop 798 on the crank 768. The leaf spring 794 rotationally biases the switch cam 770 relative to the crank to an OFF position.

Formed on the underside of the knob 758 are two ramps 820, each ramp having a ramp end 822 as best seen in FIG. 10. Formed on the side of the switch cam 770 which faces the knob 758 are ramp recesses 824 which have ramp recess ends 826 as best seen in FIG. 9. When the switch assembly is in the OFF position i.e. when both the knob 758 and the switch cam 770 are in their OFF positions under the biasing force of their respective springs 784, 794, each of the two ramps 820 is located in a corresponding ramp recess 824 with the ramp ends 822 of each ramp 820 abutting directly against the ramp recess ends 826 of the corresponding ramp recess 824.

Figure 8A:
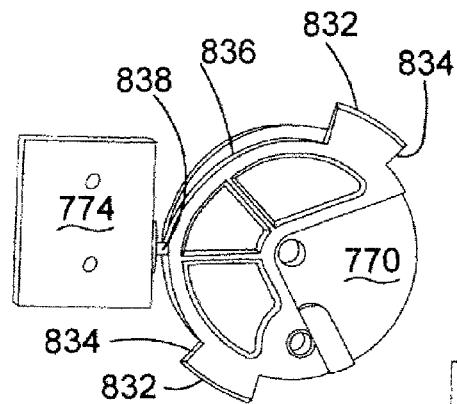
FIGS. 8A to 8E show the switch cam and micro switch.
Figure 8B:
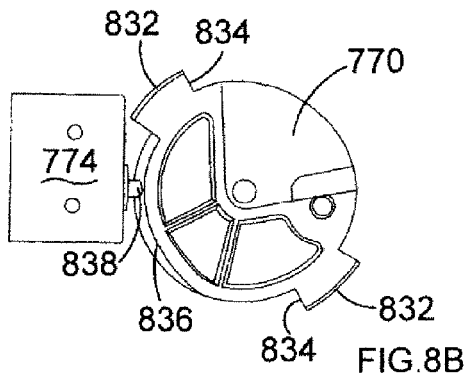
Figure 8C:
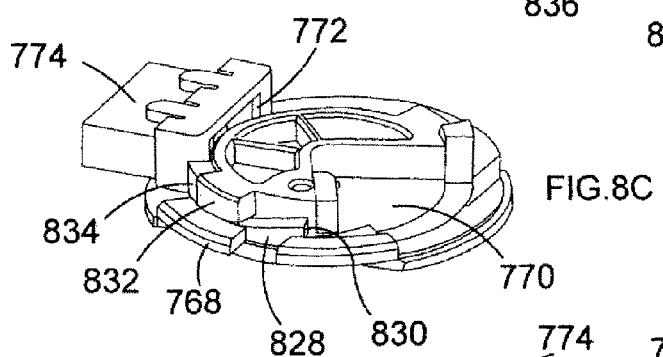
Figure 8D:
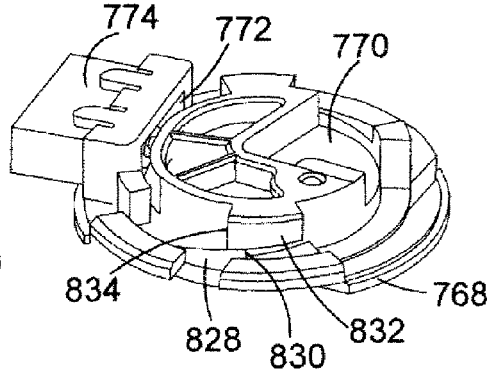

Formed on the underside of the crank 768 are two crank ramps 828, each ramp 828 having a crank ramp end 830 as best seen in FIG. 8C. Formed on the side of the switch cam 770 which faces the knob 758 are switch cam crank ramps 832 which have switch cam crank ramp ends 834 as best seen in FIG. 9. When the switch assembly is in the OFF position i.e. with both the knob and the switch cam 770 in their OFF positions under the biasing force of their respective springs 784, 794, each of the two switch cam crank ramps 832 are located against the low end (the end of the crank ramp 828 away from the crank ramp end 830) of the corresponding crank ramp 828 as shown in FIG. 8C.

Formed around the edge of the switch cam 770 is a peripheral cam 836 as best seen in FIGS. 8A and 8B. The micro switch 774 comprises a pin 838 which projects from the body of the micro switch 774. The pin 838 slides axially in or out of the body of the micro switch 774 and is biased to its outer most position by a spring (not shown) inside the micro switch 774. The pin 838 engages the peripheral cam 836. Rotation of the switch cam 770 causes the pin 838 to slide along the peripheral cam 836, which causes it to be pushed into the body of the micro switch 774 against the biasing force of the spring, or allows it to slide out of the body of the micro switch 774 under influence of the spring. When the switch cam 770 is in its OFF position, the pin is pushed into the body of the micro switch 774 as shown in FIG. 8A. When switch cam is rotated to its ON position, the pin 838 extends to its outer most position as shown in FIG. 8B.

Figure 8E:
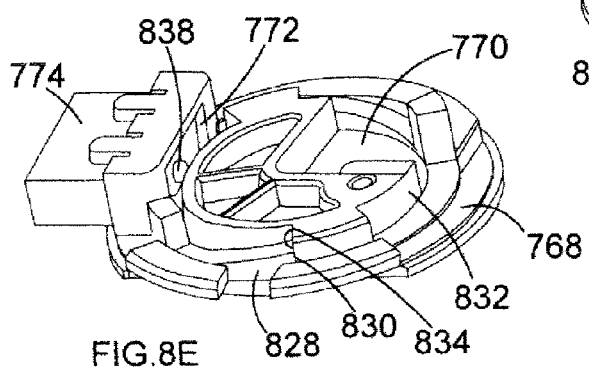

The operation of the assembly for the ON/OFF switch will now be described. Initially, the knob 758 and the switch cam 770 are both located in their OFF positions. The operator of the power cutter desires to turn the unit on using the ON/OFF switch. The operator uses their hand to rotate the knob 758 from its OFF position to its ON position. When the knob 758 is rotated, it causes the switch cam 770 to rotate in unison as the rotary movement is transferred from the knob 758 to the switch cam 770 by the ramp ends 822 of each ramp 820 pushing the ramp recess ends 826 of each corresponding ramp recess 824, against which it abuts, in the direction of Arrow M in FIG. 9, to cause the switch cam 770 to rotate with the knob 758. As the switch cam 770 rotates, the two switch cam crank ramps 832, which are initially located against the low end of the crank ramps 828 (shown in FIG. 8C), ride up the crank ramps 828 (shown in FIG. 8D), which are stationary. As the switch cam crank ramps 832 ride up the crank ramps 828 due to the rotation of the switch cam 770, the switch cam 770 is forced to axially slide away from the knob 758 (direction of Arrow N in FIG. 9), causing the spring 780 to be compressed and the head of the bolt 778 to move towards the base of the recess 776. When the switch cam has rotated sufficiently that the crank ramp ends 830 and the switch cam crank ramp ends 834 become aligned, the switch cam 770 axially slides under the biasing force of the spring 780 towards the knob 758, ensuring that the crank ramp end 830 and the switch cam crank ramp ends 834 abut against each other as shown in FIG. 8E. When the crank ramp ends 830 and the switch cam crank ramp ends 834 abut each other as shown in FIG. 8E, the switch cam 770 is in its ON position and is prevented from returning to its OFF position, under the influence of the leaf spring 794, as the crank ramp ends 830 and the switch cam crank ramp ends 834 prevent relative movement as they are jammed against each other. The knob 758 is prevented from returning to its OFF position under the influence of the spring 784 by the ramps 820 being held within the ramp recesses 824 by the action of the spring 780 which overrides the spring 784. When the switch cam 770 rotates from the OFF position (see FIG. 8A) to the ON position (FIG. 8B), the peripheral cam 836 rotates, which in turn allows the pin 838 to extend from the body of the micro switch 774. This in turn makes a connection which allows the electric controller 716 to activate the power cutter and allow it to start when the pull cord is pulled.

As such, the assembly of the ON/OFF switch is now ON with the knob 758 and the switch cam 770 both in their ON positions, allowing the pin 838 to extend from the body of the micro switch 774. There are two ways of switching the ON/OFF switch assembly to its OFF position.

The first method comprises the depression of the stop button 766. Depression of the stop button 766 causes the head of the bolt 778 to slide towards the base of the recess 776 of the knob 758, compressing the spring 780, which in turn causes the switch cam 770 to axially slide away from the knob 758. As the switch cam 770 axially slides, the switch cam 770 moves away from the crank 768, which in turn causes the crank ramps 828 and the switch cam crank ramps 832 to move away from each other, and thus causes the crank ramp ends 830 and the switch cam crank ramp ends 834 to disengage. As such, the switch cam 770 can now rotate back to its OFF position under the influence of the leaf spring 794. As the knob is held in its ON position by the ramps 820 being held within the ramp recesses 824, the knob 858 will also return to its OFF position as the ramp recesses 824 rotate with the switch cam 770. Should the ramps 820 become disengaged from the ramp recesses 824 due to the sliding movement of the switch cam 770 relative to the knob 758, the knob 758 will return to its OFF position under the influence of the spring 784 between the knob 758 and the crank 768.

The second method of switching the ON/OFF switch assembly OFF comprises the rotation of the knob 758. The operator rotates the knob 758 to its OFF position. As the ramps 820 are held within the ramp recesses 824, rotation of the knob 758 urges rotation of the switch cam 770. However, the switch cam 770 is prevented from rotating as the crank ramp ends 830 and the switch cam crank ramp ends 834 abut each other. Therefore, the ramps 820 slide out of the ramp recesses 824, the ramp ends 822 moving away from ramp recess ends 826. As the ramps 820 slide out of the ramp recesses 824, the switch cam 770, which is prevented from rotating, axially slides away from the knob 858 by the camming action of the ramps 820 and ramp recesses 824. When the switch cam 770 has slid sufficiently far enough away from the knob 758, the crank ramp ends 830 and the switch cam crank ramp ends 834, which are sliding away from each other, become disengaged. Thus, the switch cam 770 can rotate under the influence of the leaf spring 794 to its OFF position. The knob 758 will move under the influence of the operator and/or the spring 784. As such, both the knob 758 and the switch cam 770 return to their OFF position where they are held by the springs 784, 794.

When both the knob and switch cam 770 move to their OFF positions, the ramps 820 engage with the ramp recesses 824 so that the switch can be used again to switch on the power cutter.

The operation of the power cutter will now be described.

The operator first activates the DECO valve 752 and then pumps some fuel into the carburetor 126 using the primer 734. The operator then switches the ON/OFF switch to ON by rotation of the knob 758 to its ON position. The operator then pulls the pull cord to rotate the crank 114 of the engine. As the crank 114 rotates, the flywheel 702 also rotates causing the two generators 706, 708 to produce sufficient electricity to operate the power cutter.

The electronic controller 716 checks the temperature of the engine using sensor 710. If the engine is cold, the electronic controller uses the electricity from the second generator 708 to power the solenoid 714 in the carburetor to set the "automatic choke". The second generator 708 is not powerful enough to power both the oil pump 700 and solenoid 714 at the same time. Therefore, when the electronic controller 716 is operating the solenoid 714, it switches off the oil pump 700. It has been found that the period during which lubricating oil is not required before the engine is damaged is greater than that required to heat up the engine.

The electronic controller 716 supplies the power to the spark plug 730 to cause combustion in the engine, the power being provided by the first generator 706, the timing being determine by the electronic controller 716 based on the signal provided by the sensor 712 in relation to the angular position of the flywheel 702.

Once the engine commences firing, the DECO valve automatically closes. The electronic controller 716 continues to monitor the engine temperature and when it has reached a predetermined temperature, the electronic controller 716 switches the solenoid 714 in the carburetor 126 off. The electronic controller 716 then commences supplying a square shape voltage signal to the oil pump to commence pumping oil. The electronic controller 716 monitors the speed of the engine using the signal provided by the sensor 712 monitoring the angular position of the flywheel 702 to calculate the rotational speed. If the rotational speed is below a predetermined value, the electronic controller 716 sends a signal (FIG. 14A) to the oil pump 700 to cause it to pump at a slow speed. If the rotational speed is above a predetermined value, the electronic controller 716 sends a signal (FIG. 14B) to the oil pump 700 to cause it to pump at a higher speed. The speed of the engine is dependent on the operator squeezing a trigger switch which connects to the carburetor via a cable.

While the engine is running, the electronic controller 716 monitors the oil being added to the fuel/air mixture using the sensor 140. If the sensor 140 detects that the rate of flow of the oil being pumped by the oil pump 700 has dropped below a predetermined amount (e.g. there is a blockage in the oil pipe 142 or the tank 128 is empty), the electronic controller places the engine into an idle mode using the ignition system so that the engine runs, but at a minimal rate. The operator cannot speed up the engine using the trigger until the sensor 140 detects the flow of oil. This protects the engine from damage due to a lack of lubrication. It has been found that the engine can run in idle mode for a considerable period of time before damage to the engine results.

In order for the operator to stop the power cutter, the operator either depresses the stop button 766 or rotates the knob 758 to its OFF position.

An embodiment of an ON/OFF switch according to the present invention will now be described with reference to FIGS. 15 to 24. This embodiment provides an alternative design of the ON/OFF switch to the example described above and can be substituted for that design in a power cutter as described above.

Where the same features in this embodiment are the same as those disclosed in the previous example of the ON/OFF switch described above, the same reference numbers have been used.

Except for the design of the ON/OFF switch 754, the design of the rest of the power cutter is that same as that described above with reference to FIGS. 1 to 14.

The switch 754 comprises a rotatable knob 758. The knob 758 has a pointer 764 integrally formed on its periphery. The rotatable knob 758 has two angular positions between which it can rotate. In the first position, the switch is ON. In this position, the pointer 764 points to an ON label 762 (see FIG. 19A). In the second position, the switch is OFF. In this position, the pointer 764 points to an OFF label 760 (see FIG. 17A). When the rotatable knob is in the ON position, the operator can start the engine and use the power cutter. When the rotatable knob 758 is in the OFF position, the engine is prevented from being started. If the rotatable knob 758 is moved from the ON to the OFF position when the engine is running, the engine is automatically switched off.

A stop button 766 is located in the center of the knob 758. If the engine is running (i.e. the knob is in the ON position), depression of the stop button 766 will result in the engine being switched off.

A circular hole 900 is fowled through the rear wall 736 of the housing 800. The rotatable knob 758 is mounted onto the outside of the rear wall 736 adjacent the circular hole 900. A cam wheel 902 is rotatably mounted on the inside of the rear wall 736 adjacent the circular hole 900. Two screws (not shown) connect the rotatable knob 758 to the cam wheel 902, the screws passing through the circular hole 900. The peripheries of the rotatable knob 758 and the cam wheel 902 sandwich the periphery of the circular hole 900 to hold the rotatable knob 758 and the cam wheel 902 in place on the rear wall over the circular hole 900. The rotatable knob 758 and the cam wheel 902 can rotate about the central axis of the circular hole, the rotatable knob 758 and the cam wheel 902 rotating in unison.

Figure 16:
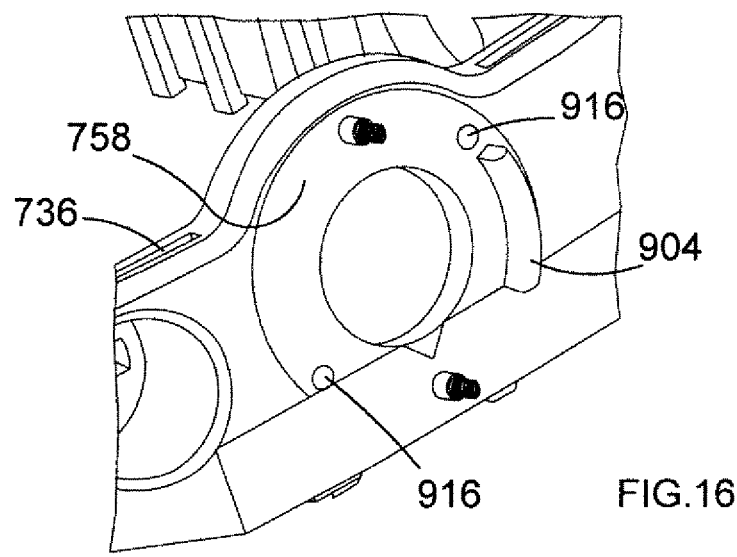
FIG. 16 shows a partial cross sectional view of the on/of switch of FIG. 15.
Figure 20:
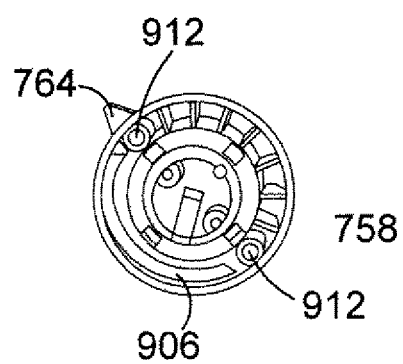
FIG. 20 shows the under side of the knob.

Formed on the part of the rear wall 736 sandwiched between the rotatable knob 758 and the cam wheel 902 is a curved rib 904 (see FIG. 16). Formed on the rear of the rotatable knob 758 is a correspondingly shaped groove 906 (see FIG. 20). When the rotatable knob 758 is mounted on the rear wall 736, the rib 904 locates inside the groove 906. The length of the groove 906 is longer than the rib 904 allowing the rib 904 to slide within the groove. This restricts the amount of pivotal movement of the knob, and hence the cam wheel 902, to sixty degrees, allowing the pointer 764 to pivot between its angular positions between its ON and OFF positions.

Also formed on the rear of the rotatable knob 758 are two pockets 908, 910. Located in each pocket 908, 910 are pins 912 and springs 914 which bias the pins 912 out of the pockets 908, 910. The pins 912 are prevented from completely exiting the pockets 908, 910 by the springs 914. Formed on the part of the rear wall 736 sandwiched between the rotatable knob 758 and the cam wheel 902 are two pairs of recesses 916, each recess 916 in each pair being located on the opposite side of the circular hole 900 to the other recess in that pair. The location of each pair of recesses 916 corresponds to an angular position of the knob 758. When the knob 758 is rotated to one of its angular positions, the pins 912 locate within the recesses 916 of the first corresponding pair, due for the biasing force of the springs 914, to latch the knob 758 in that angular position and hold it there. When the knob 758 is rotated, the pins 912 ride out of the recesses 916 by being pushed into the pockets 910. As the knob 758 rotates, the pins 912 remain in the pockets 910. When the knob 758 moves to its second angular position, the other pair of recesses 916 align with the pins 912, which then move out of the pockets 910 and enter the recesses 916 under the biasing force of the springs 914. The knob is then latched in its second angular position.

Figure 17A:
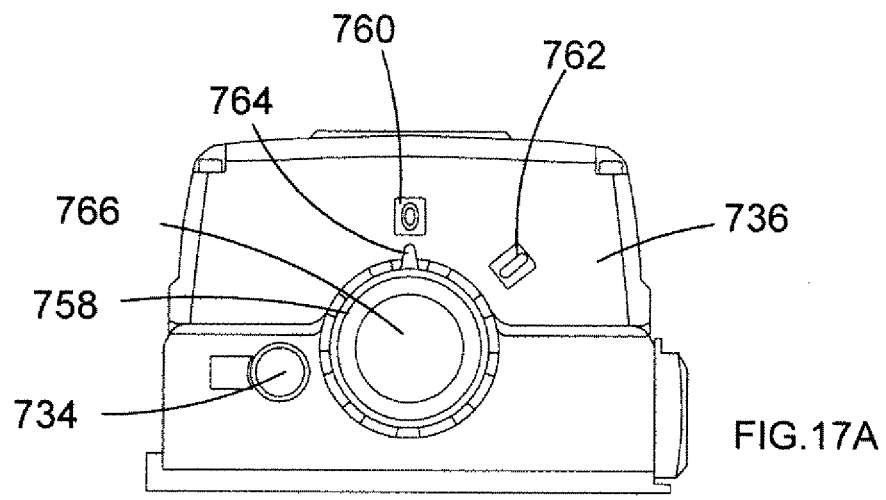
FIG. 17A shows the rotatable knob in the OFF position.
Figure 17B:
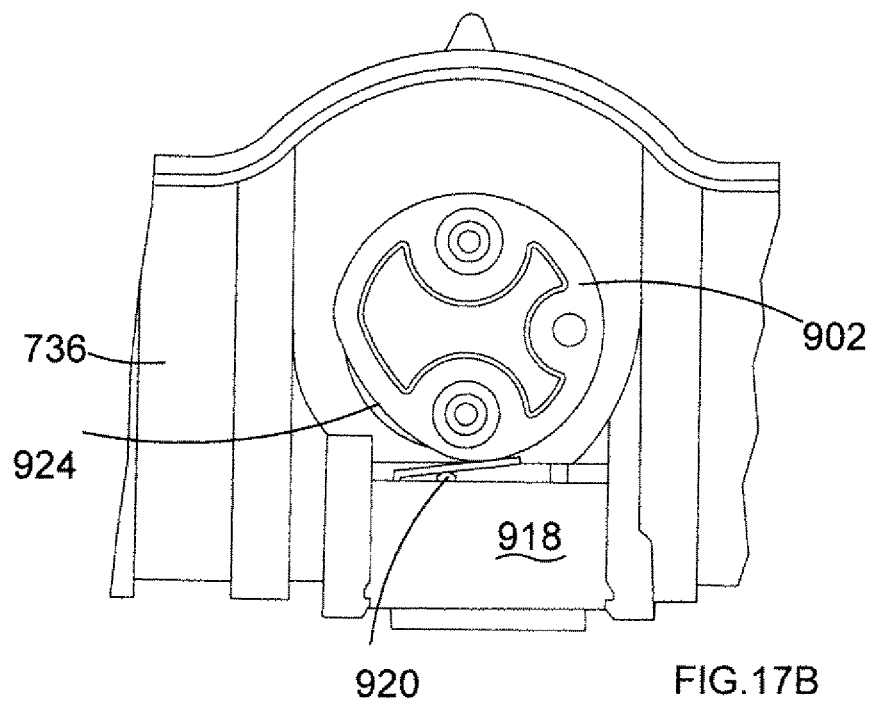
FIG. 17B shows the position of cam wheel when the rotatable knob is in the position shown in FIG. 17A.
Figure 18:
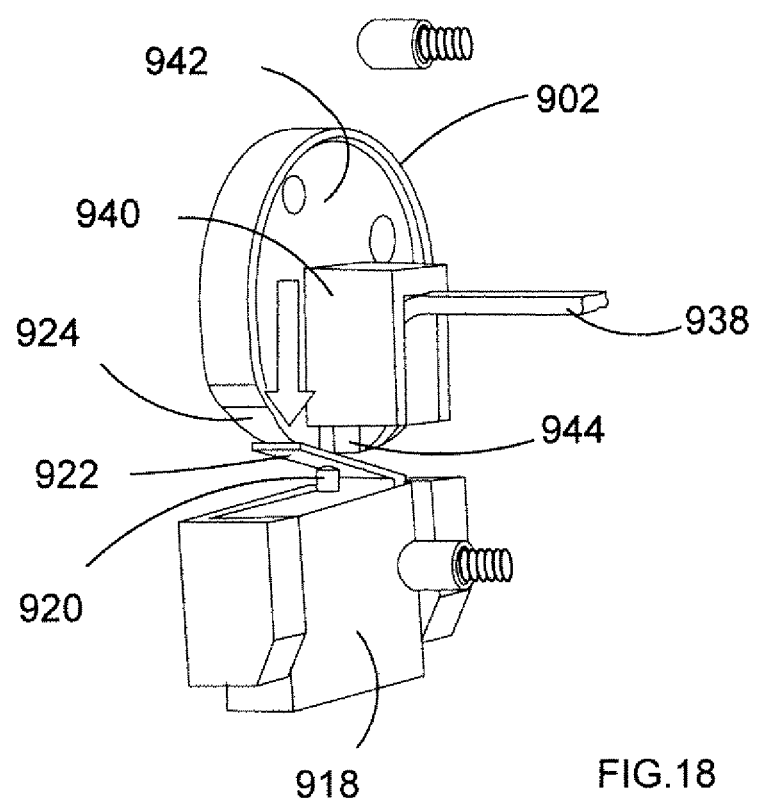
FIG. 18 shows the cam wheel and micro switch.

Mounted with a bracket 926 on the inside of the rear wall 736, adjacent the cam wheel 902 is a micro switch 918 (see FIG. 17B). The micro switch 918 comprises a pin 920 which projects from the body of the micro switch 918. The pin 920 slides axially in or out of the body of the micro switch 920 and biased to its outer most position by a spring (not shown) inside the micro switch 920. A lever 922 is pivotally attached to the micro switch 918. The lever 922 lies across the end of the pin 920. Pivotal movement of the lever 922 towards the micro switch 918, pushes the pin 920 into the micro switch 918.

Formed around the edge of the cam wheel 902 is a peripheral cam 924 as best seen in FIG. 17B. The peripheral cam 924 engages with the lever 922. Rotation of the cam wheel 902 causes the lever 922 to slide along the peripheral cam 924, which causes it to be pivoted towards the body of the micro switch 918, which in turn pushes the pin 920 into the micro switch 918, against the biasing force of the spring, or to be pivoted away from the body of the micro switch 918, due to biasing force on the pin 920, allowing the pin 920 to slide out of the body of the micro switch 918 wider influence of the spring. When the cam wheel is in its OFF position (FIG. 17B), the pin 920 is pushed into the body of the micro switch 918. When the cam wheel 902 is rotated to its ON position, the pin 920 extends to its outer most position as shown in FIG. 19B.

The micro switch 918 can be switched on and off by the depression or release of the pin 920 by the rotation of the knob 758 between its two angular positions.

The stop button 766 is mounted within a tubular recess 934 formed in the knob 758 and slides within the recess 934 towards or away from the base 936 of the recess 934. A spring 928 is sandwiched between the stop button 766 and the base 936 of the recess and biases the stop button 766 out of the recess 934. The range of outward movement of the stop button 766 is limited by four stops 930 mounted on legs 932 which engage with the underside of the knob 758 when the stop button has reached its maximum outward position. The range of inward movement of the stop button 766 is limited by the base 936 of the recess 934.

Figure 23A:
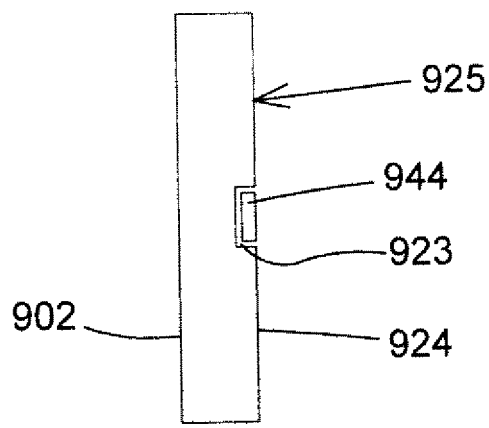
FIG. 23A shows a side view of the cam wheel having a three-sided aperture formed in the peripheral cam.
Figure 23B:
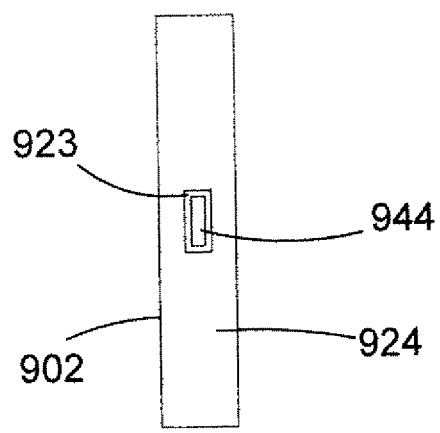
FIG. 23B shows a side view of the cam wheel having a four-sided aperture formed in the peripheral cam.
Figure 23C:
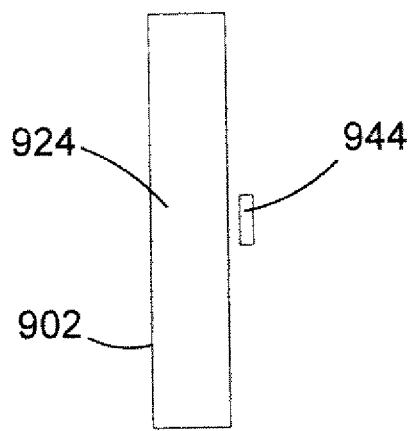
FIG. 23C shows a side view of the cam wheel with the end of the tongue alongside of the peripheral cam.

Attached to the underside of the stop button 766 is a flexible tongue 938. The tongue extends through an aperture in the base 936 of the recess 934 and then is curved by a guide 940 formed on the inner wall 942 of the wheel cam 902 through 90 degrees towards an aperture 923 formed in the peripheral cam 924 (see FIG. 23A). As can be seen, the aperture 923 is formed at a side edge 925 of the peripheral cam 924, the peripheral cam 924 providing three sides to the aperture 921 However, it will appreciated that the aperture 923 can be formed in the middle of the peripheral cam 924 as shown in FIG. 23B. Alternatively, the end 944 of the tongue can pass along side of the peripheral cam 924 as shown in FIG. 23C, thus avoiding the need to form an aperture in the peripheral cam 924. When the stop button 766 is located in its most outward position, the end 944 of the tongue 938 is located just inside of the guide 940 adjacent the aperture 923 in the peripheral cam 924. When the stop button 766 is located in its most inward position, the end 944 of the tongue 938 passes through and projects from the aperture 923 in the peripheral cam 924. Depression of the stop button 766 causes the end 944 of the tongue 938 to exit the aperture 923 in the peripheral earn 924.

Figure 19A:
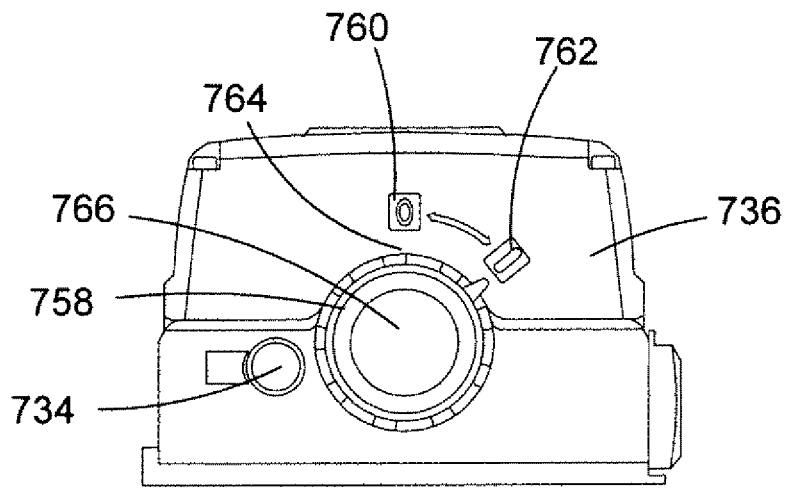
FIG. 19A shows the rotatable knob in the ON position.
Figure 19B:
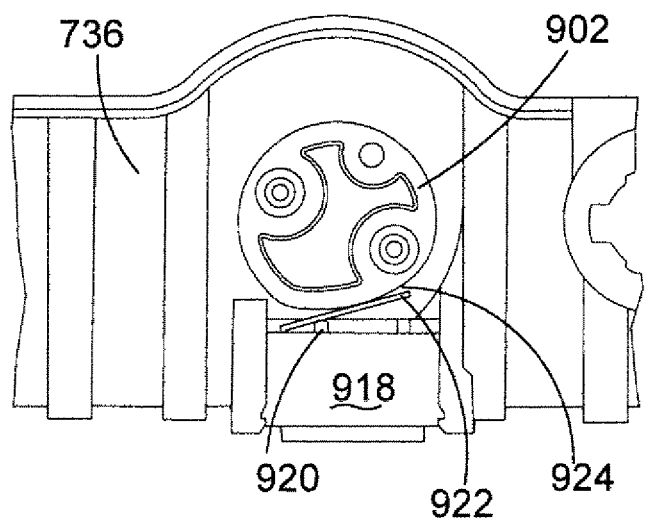
FIG. 19B shows the position of cam wheel when the rotatable knob is in the ON position.
Figure 21:
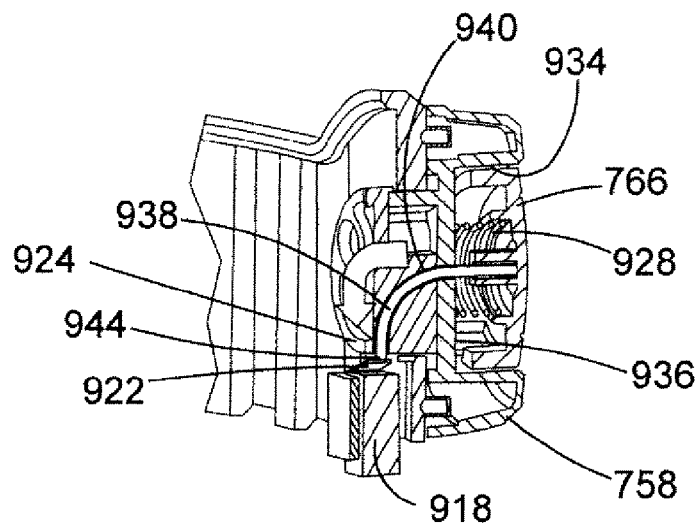
FIG. 21 shows a cross sectional view of the ON/OFF switch.
Figure 22A:
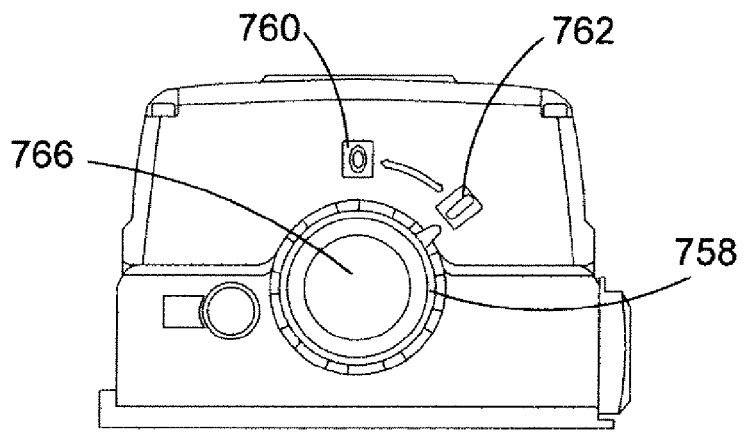
FIG. 22A shows the rotatable knob in the ON position but with the stop button depressed.
Figure 22B:
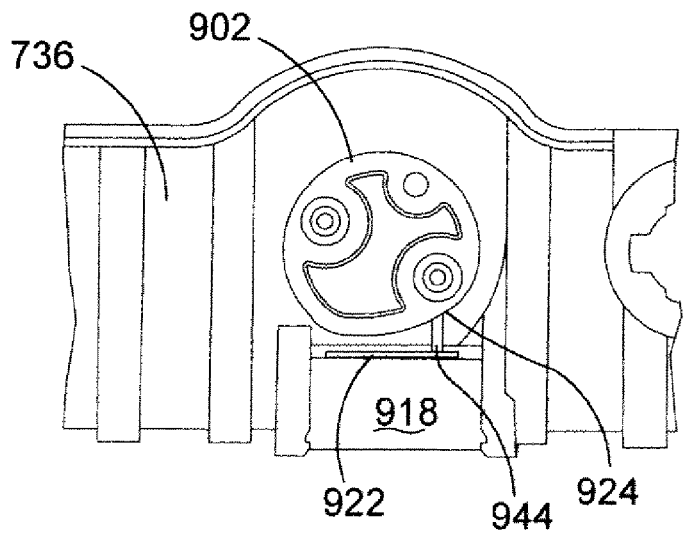
FIG. 22B shows the position of cam wheel when the rotatable knob is in the ON position with end of the tongue extended.

When the knob 758 is in its ON position as shown in FIG. 19A, the aperture 923 in the peripheral cam 924 faces the lever 922. When the knob 758 is in its ON position, the peripheral cam 924 allows the lever 922 to pivot away from the micro switch 918, in turn allowing the pin 920 to slide out of the micro switch (see FIG. 19B). The stop button 766 is biased towards its outward position by the spring 928. As such, the end 944 of the tongue 938 is located within the cam wheel 902. However, when the stop button is pushed into the recess, the end 944 of the tongue is pushed through the aperture in the peripheral cam 924, away from the cam wheel 902, into engagement with the lever 922. As the end 944 of the tongue continues to move away from the cam wheel 902, it pivots the lever 922 toward the micro switch 918, pushing the pin 920 on the micro switch 918 into the micro switch. When the knob 758 is in its OFF position as shown in FIG. 17A, the aperture in the peripheral cam 924 is located away from the lever 922 and therefore depression of stop button has no effect on the lever as the end of the tongue can not engage it.

Initially, the ON/OFF switch is in its OFF position, with the rotatable knob 758 in its first angular position and the pointer 764 pointing to the OFF label 760. The peripheral cam 924 on the cam wheel 902, is located in a position where it pushes the pivotal lever 922 towards the micro switch 918 which in turn pushed the pin 920 into the micro switch (see FIG. 17A). When the pin is in this position, it provides a signal to the electric controller 716, when an electrical power supply is provided to the micro switch 918 and electric controller 716 by the operation of the pull cord of the power cutter that the engine can not be started. In order for the power cutter to be started, the rotatable knob 758 is rotated to its first angular position, the pointer 764 pointing to the ON label 762 to put the ON/OFF switch in its ON position. As the rotatable knob 758 rotates, the cam wheel 902, and hence the peripheral cam 924 also rotate in unison. The peripheral cam 924 rotates to a position where it allows the pivotal lever 922 to pivot away from the micro switch 918 which in turn allows the pin 920 to extend from the micro switch (see FIG. 19B). When the pin 920 is in this position, it provides a signal to the electric controller 716, when an electrical power supply is provided to the micro switch 918 and electric controller 716 by the operation of the pull cord of the power cutter, that the engine can be started. Whilst the engine is running, the pin 920 must remain extended from the micro switch 918. In order to switch the power cutter off, the pin 920 of the micro switch must be pushed into the micro switch 918. This is achieved in one of two ways. Firstly, the rotatable knob 758 can be rotated to its OFF position. Rotation of the knob 758 results in rotation of the cam wheel and peripheral can 924, causing the peripheral cam 924 to push the lever 922 towards the micro switch 918 and hence the pin into the micro switch 918. Secondly, the stop button 766 can be pushed into the recess 934, causing the end 944 of the tongue 938 to project out of the aperture 923 in peripheral cam 924 and into engagement with the lever 922, causing it pivot towards the micro switch 918 hence pushing the pin into the micro switch 918. When the pin 920 is pushed inside of the micro switch 918, it provides a signal to the electric controller 716 that the engine should be stopped. If the engine is stopped by depression of the stop button 766, release of the stop button will allow to return to its outer most position under the biasing force of the spring 928. When this happens the end 944 of the tongue 938 is retracted through the aperture in the peripheral cam 924 inside of the cam wheel 902 allowing the lever 922 to pivot away from the micro switch and hence the pin 920 to slide out of the micro switch 91.

The operation of the power cutter is the same for this embodiment of ON/OFF switch as for the previous example of ON/OFF switch.

It will be appreciated by a person skilled in the art that an additional safety feature could be added whereby, when the engine has been stopped by depression of the stop button 766, the rotatable knob 758 has to be first rotated to its OFF position and then back to its ON position before the engine can be started again.

FIG. 24 shows an alternative design of stop button 766 where the tongue 938 is integrally formed with the button 766.

We claim:

1. A switch mechanism comprising:
a support structure;
an electric switch mounted on the support structure and which comprises an activator moveable between a first position where the electric switch is switched on and a second position where the electric switch is switched off;

a first actuator moveably mounted on the support structure;

a cam, having a cam surface, connected to the first actuator so that movement of the first actuator results in movement of the cam;

a second actuator moveably mounted on the support structure;

a bar connected to the second actuator so that movement of the second actuator results in movement of the bar;

wherein the cam engages the activator so that movement of the cam by movement of the first actuator results in the activator moving between its two positions; wherein the bar engages the activator so that movement of the bar by movement of the second actuator results in the activator moving between its two positions;

wherein the bar passes through or alongside the surface of the cam when it engages the activator.

2. The switch mechanism as claimed in claim 1, wherein the first actuator comprises a recess in which is located the second actuator, which is a slidable button and which is linearly slid within the recess between a first position and a second position, the second actuator being biased towards its first position.

3. The switch mechanism as claimed in claim 2, wherein movement of the first actuator, when the second actuator is in its first position, moves the activator between its first and second positions; and wherein movement of the second actuator from its first position to its second position, when the activator is in its first position, moves the activator to its second position.

4. The switch mechanism as claimed in claim 1, wherein the first actuator is movable between two positions to move the activator between its two positions, the first actuator being latchable in either of the positions.

5. The switch mechanism as claimed in claim 1, wherein the first actuator comprises a rotatable knob rotatable about an axis of rotation.

6. The switch mechanism as claimed in claim 5, wherein the cam is directly mounted on the rotatable knob so that rotation of the knob about its axis of rotation results in rotation of the cam about the axis of rotation of the knob.

7. The switch mechanism as claimed in claim 1, wherein the bar is elongated and slides linearly.

8. The switch mechanism as claimed in claim 1, wherein an end of the bar engages the activator.

9. The switch mechanism as claimed in claim 1, wherein the bar comprises a flexible tongue.

10. The switch mechanism as claimed in claim 9, wherein the flexible tongue curves through 90 degrees along its length.

11. The switch mechanism as claimed in claim 1, wherein the activator comprises a slidable pin which engages at least one of the surface of the cam and the bar.

12. The switch mechanism as claimed in claim 11, wherein the slidable pin is slidable into or out of the electric switch.

13. The switch mechanism as claimed in claim 11, wherein the activator further comprises a pivotal lever which is located against the slidable pin, and wherein pivotal movement of the lever results in the sliding movement of the pin, the lever being engaged by the surface of one of the cam and the bar.

14. A power tool comprising a switch mechanism including a support structure; an electric switch mounted on the support structure and which comprises an activator moveable between a first position where the electric switch is switched on and a second position where the electric switch is switched off; a first actuator moveably mounted on the support structure; a cam, having a cam surface, connected to the first actuator so that movement of the first actuator results in movement of the cam; a second actuator moveably mounted on the support structure; and a bar connected to the second actuator so that movement of the second actuator results in movement of the bar, wherein;
1) when the electric switch is on and the power tool is deactivated, the power tool is able to be activated, and;
2) when the electric switch is off and the power tool is deactivated, the power tool is prevented from being activated, and;
3) when the switch is moved from being on to being off when the power tool is activated, the power tool is deactivated.

* * * * *